(12) United States Patent
Kim

(10) Patent No.: US 8,854,795 B2
(45) Date of Patent: Oct. 7, 2014

(54) GAS INSULATED SWITCHGEAR

(75) Inventor: Hyung Choon Kim, Ulsan (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 0 days.

(21) Appl. No.: 13/447,854

(22) Filed: Apr. 16, 2012

(65) Prior Publication Data

US 2014/0211378 A1    Jul. 31, 2014

(51) Int. Cl.
*H02B 1/20* (2006.01)
*H02B 7/01* (2006.01)

(52) U.S. Cl.
CPC ........................................ *H02B 7/01* (2013.01)
USPC ............................. 361/612; 361/605; 361/622

(58) Field of Classification Search
None
See application file for complete search history.

(56) References Cited

U.S. PATENT DOCUMENTS

| | | | |
|---|---|---|---|
| 4,687,890 A | | 8/1987 | Yamamoto et al. |
| 4,967,307 A | | 10/1990 | Itou et al. |
| 5,373,415 A | * | 12/1994 | Tawaratani ................... 361/612 |
| 5,559,669 A | * | 9/1996 | Inami et al. ................... 361/612 |
| 5,578,804 A | * | 11/1996 | Berger et al. .................... 218/43 |
| 5,625,530 A | * | 4/1997 | Inami et al. ................... 361/604 |
| 6,762,386 B2 | * | 7/2004 | Itou et al. ......................... 218/43 |
| 7,391,605 B2 | * | 6/2008 | Sologuren-Sanchez et al. .............................. 361/612 |
| 7,764,486 B2 | * | 7/2010 | Otsuka et al. ................. 361/612 |
| 7,835,140 B2 | * | 11/2010 | Mori et al. .................... 361/619 |
| 8,000,087 B2 | * | 8/2011 | Fujita et al. ................... 361/612 |
| 8,089,020 B2 | * | 1/2012 | Kisanuki et al. .................. 218/7 |
| 8,254,088 B2 | * | 8/2012 | Tanaka et al. ................. 361/604 |
| 2009/0116176 A1 | | 5/2009 | Mori et al. |

FOREIGN PATENT DOCUMENTS

JP    2002-078125    3/2002

* cited by examiner

*Primary Examiner* — Boris Chervinsky
(74) *Attorney, Agent, or Firm* — Keohane & D'Alessandro PLLC

(57) ABSTRACT

A gas insulated switchgear including a circuit breaker, a first through third switches, a voltage transformer, a cable head, a gas insulated busbar unit, and first and second current transformers is provided. The gas insulated busbar unit is connected with the second current transformer and the first and second switches are connected with a bottom of the gas insulated busbar unit. The third switch is connected with the first current transformer, the cable head is connected with the third switch, and the voltage transformer is connected with a top of the cable head. The first and second current transformers are respectively connected with first and second sides of the circuit breaker.

5 Claims, 8 Drawing Sheets

GAS INSULATED SWITCHGEAR

CROSS-REFERENCE TO RELATED APPLICATIONS

This application claims foreign priority under 35 U.S.C. §119 to Korean Patent Application No. 10-2011-0071370 filed Jul. 19, 2011 with the Korean Intellectual Property Office, which is hereby incorporated by reference in its entirety.

BACKGROUND OF THE INVENTION

1. Field of the Invention

The present invention relates to a GIS (Gas Insulated Switchgear) and more particularly, to a GIS with current transformers in first and second sides of circuit breaker.

2. Description of the Related Art

In general, a GIS (Gas Insulated Switchgear) includes a circuit breaker unit, a disconnecting switch unit, a ground switch unit, a potential current transforming unit, a main busbar unit, and so on, in a grounded metal tank. An inner section of the GIS is filled with Sulfur hexafluoride (SF6) gas excellent for insulation and arc extinction, and the GIS has advantages for substation miniaturization, improvement of safety and reliability, easy operation and maintenance, and so on.

As illustrated in FIGS. 1(a)-(b), a prior art GIS 100 includes a circuit breaker 110, a current transformer 120, a circuit breaker driving unit 130, a first switch 140, a second switch 150, a third switch 130, a cable head 170, a voltage transformer 180 and first and second main busbars 190a and 190b. In the GIS 100, the current transformer 120 is connected in a rear of the circuit breaker 110 and the first and second switches 140 and 150 are connected in a front of the circuit breaker 110.

FIG. 2 is a circuit diagram of the prior art gas insulated switchgear in FIG. 1.

In FIG. 2, the current transformer 120 is located between the third switch 160 and the circuit breaker 110. The first and second switches 140 and 150 are directly connected with the circuit breaker 110, thereby flowing current to the first and second main busbars 190a and 190b.

Such a related technology is disclosed in Japanese patent publication No. 2002-165320.

SUMMARY OF THE INVENTION

Aspects of the present invention provide a GIS (gas insulated switchgear) arranging current transformers and a circuit breaker therebetween, thereby overcoming installation space limitations.

In some embodiments, a gas insulated switchgear includes a circuit breaker, first through third switches, a voltage transformer, a cable head, a gas insulated busbar unit and first and second current transformers. The gas insulated busbar unit is connected with the second current transformer, and the first and second switches are connected with a bottom of the gas insulated busbar unit. The third switch is connected with the first current transformer, the cable head is connected with the third switch, and the voltage transformer is connected with a top of the cable head. The first and second current transformers are respectively connected with first and second sides of the circuit breaker.

In one embodiment, the first current transformer and the circuit breaker may be included in package-type housing. In another embodiment, the first current transformer, a second transformer and the circuit breaker may be included in package-type housing.

In one embodiment, the first, second and third switches may include a disconnecting switch and a ground switch to have normal state, disconnecting state and ground state.

In one embodiment, the first, second and third switches may include a disconnecting switch, a repair ground switch and a line ground switch.

Accordingly, the GIS according to embodiments of the present invention may have at least the following advantage. The GIS may arrange current transformers and a circuit breaker therebetween (e.g., current transformers respectively in a front and rear of a circuit breaker) to overcome installation space limitations.

Figure 1A:
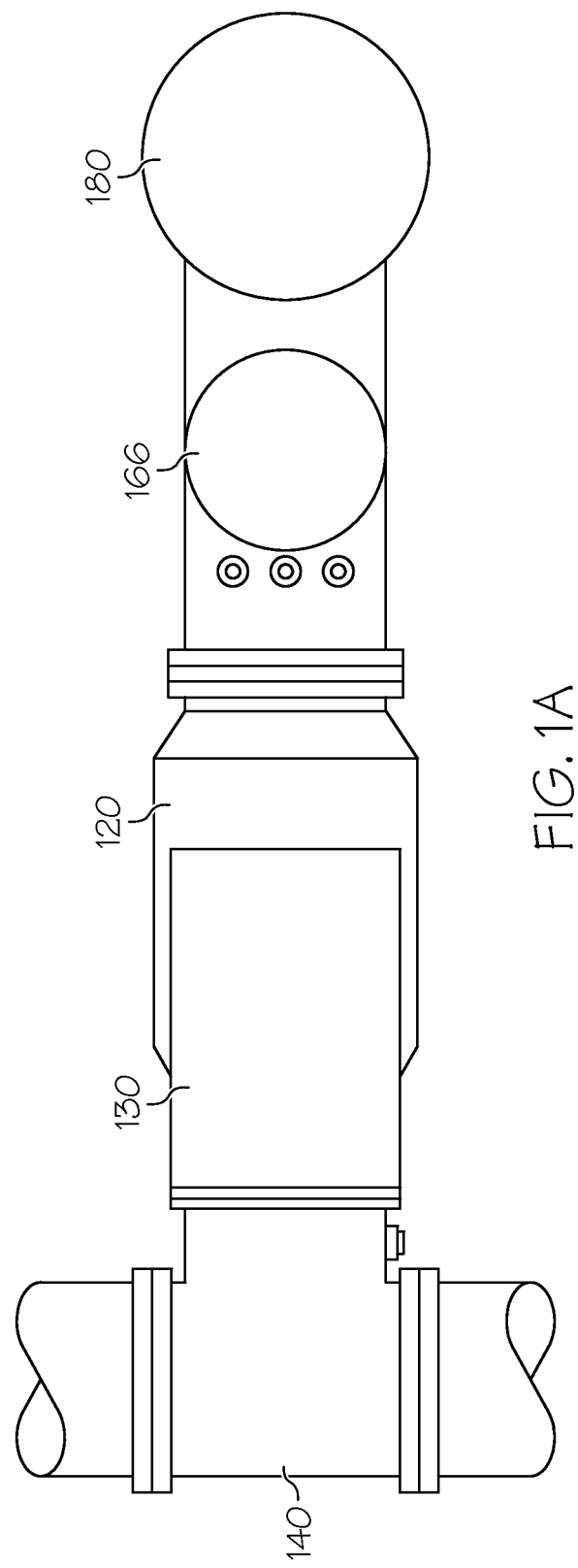
FIG. 1(a) is a plan view illustrating a prior art GIS.
Figure 1B:
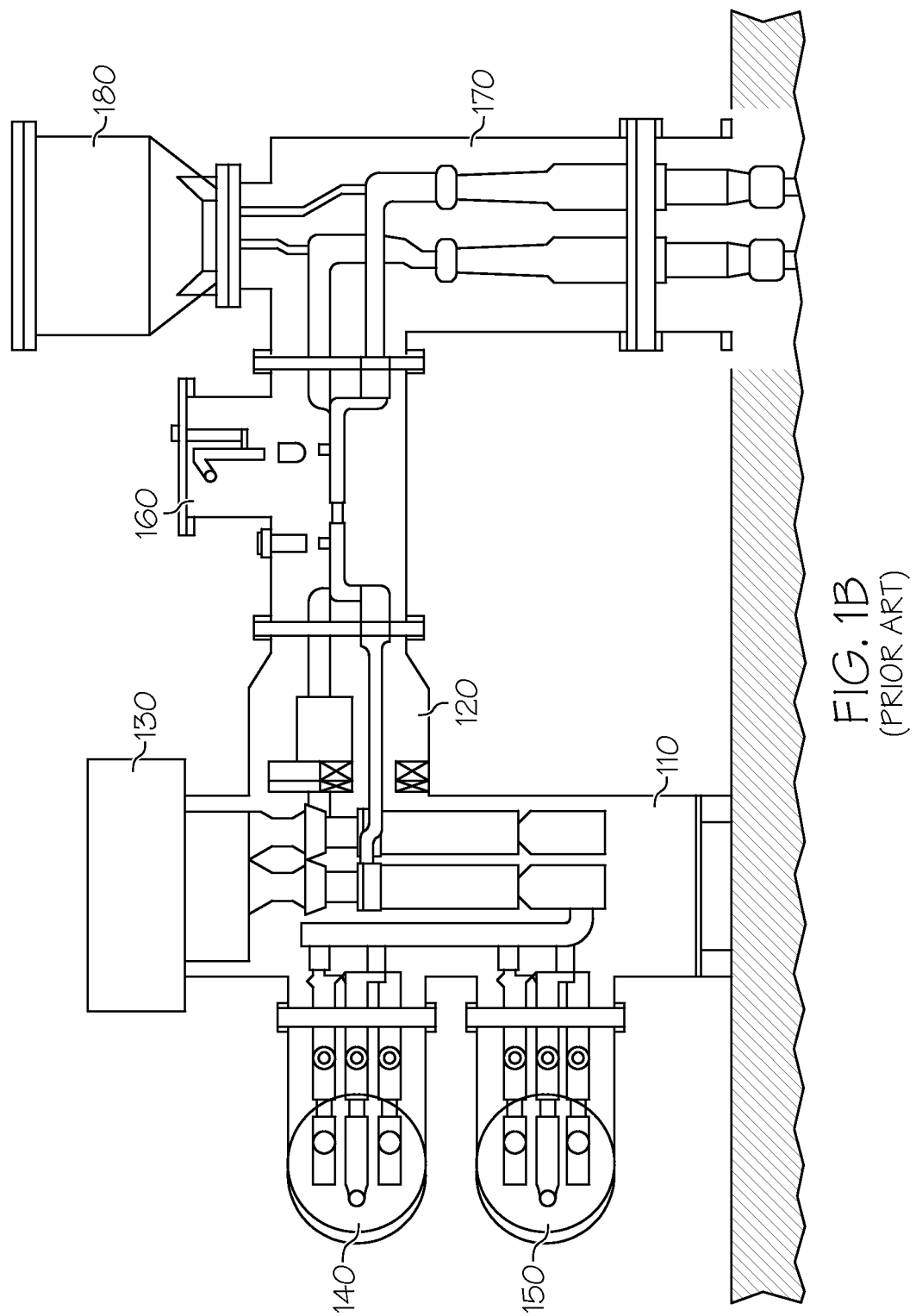
FIG. 1(b) is a perspective view of the prior art GIS of FIG. 1(a).

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Reference will now be made in greater detail to preferred embodiments of the invention, examples of which are illustrated by the accompanying drawings.

Since descriptions of the disclosed technology are only presented to describe embodiments whose purpose is to describe the structures and/or functions of the present invention, it should not be concluded that the scope of the rights of the disclosed technology is limited by the embodiments described herein. That is, the embodiments may be modified in various ways and, therefore, it should be understood that the scope of the rights of the disclosed technology may include equivalents which can implement the technical spirit of the present invention. Furthermore, since objects or advantages presented in connection with the disclosed technology do not require that a specific embodiment should fulfill all of them or only one of them, it should not be concluded that the scope of the rights of the disclosed technology is limited by the presented objects and advantages.

Meanwhile, the meanings of terms described herein should be construed as follows:

The terms "first" and "second" are only used to distinguish one element from another element, and the scope of the rights of the disclosed technology should not be limited by these terms. For example, a first element may be designated as a second element, and similarly the second element may be designated as the first element.

When it is described that one element is "connected" or "coupled" to another element, the one element may be directly connected or coupled to another element, but an intervening element may exist therebetween. On the other hand, when it is described that one element is "directly connected" or "directly coupled" to another element, it should be understood that no element exists therebetween. Meanwhile, other expressions which describe the relationships between elements, that is, "between ~" and "directly between ~" or "adjacent to ~" and "directly adjacent to ~," should be interpreted in the same way.

It should be understood that a singular expression may include a plural expression, as long as the context of the expressions is not obviously different. In this application, the meaning of "include" or "have" are intended to specify a property, a fixed number, a step, a process, an element, a component, and/or a combination thereof but are not intended to exclude the presence or addition of other properties, fixed numbers, steps, processes, elements, components, and/or combinations.

Reference throughout this specification to "one embodiment," "an embodiment," "embodiments," or similar language means that a particular feature, structure, or characteristic described in connection with the embodiment is included in at least one embodiment of the present invention. Thus appearances of the phrases "in one embodiment," "in an embodiment," "in embodiments" and similar language throughout this specification may, but do not necessarily, all refer to the same embodiment.

Reference characters (for example, a, b, c, etc.) related to steps are used for convenience of description, and are not intended to describe the sequence of the steps. The steps may occur in different sequences, as long as a specific sequence is not specifically described in the context. That is, the steps may occur in a specified sequence, may occur simultaneously, or may be performed in the reverse sequence.

All the terms used herein have the same meanings as terms that are generally understood by those having ordinary knowledge in the art to which the disclosed technology pertains, as long as the terms are defined differently. It should be understood that the terms defined in generally-used dictionaries have meanings coinciding with those of terms in the related technology. As long as the terms are not defined obviously in the present application, they are not ideally or excessively analyzed as having a formal meaning.

Figure 3A:
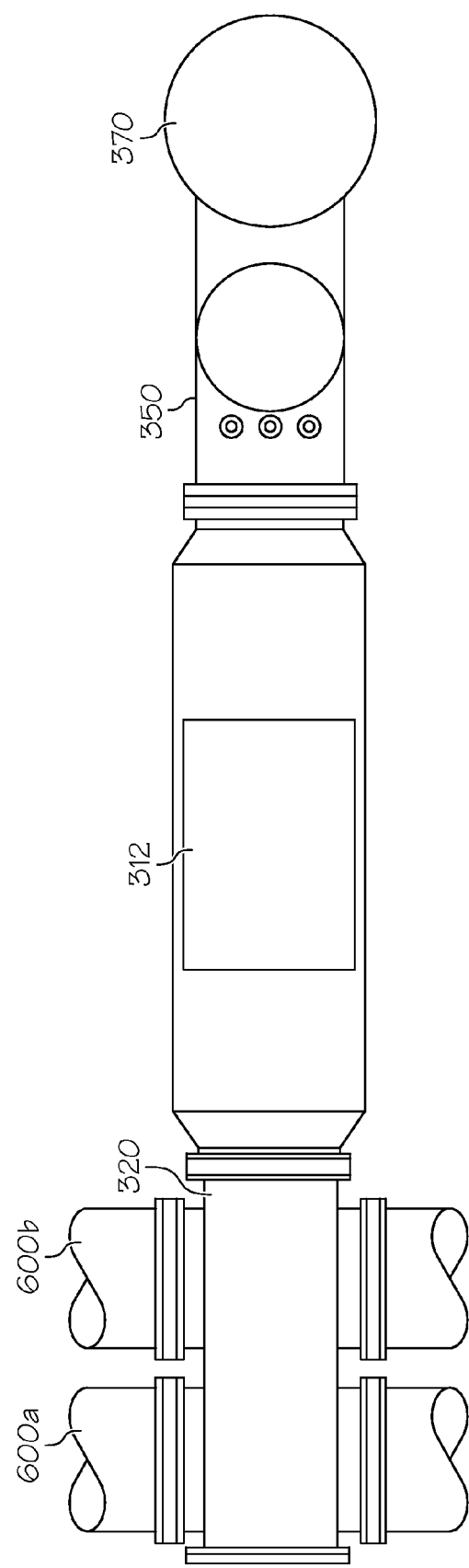
FIG. 3(a) is a plan view illustrating a GIS according to embodiments of the invention.
Figure 3B:
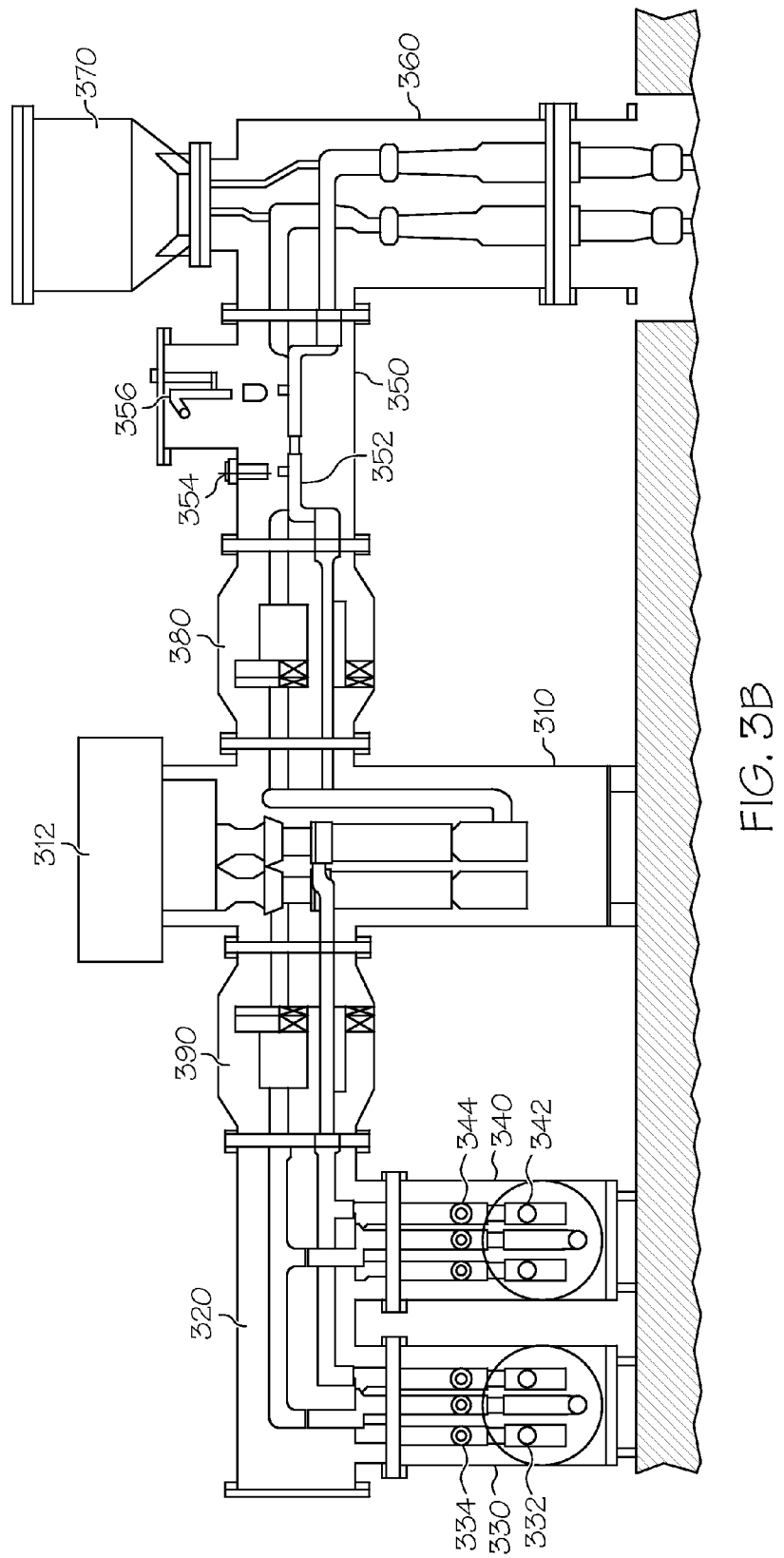
FIG. 3(b) is a perspective view of the GIS of FIG. 3(a) according to embodiments of the invention.

FIG. 3 is a diagram illustrating a GIS (Gas Insulated Switchgear) according to an example embodiment of the present invention. Herein, FIG. 3(a) is a plan view of the GIS and FIG. 3(b) is a perspective view of the GIS.

Referring to FIGS. 3(a)-(b), the GIS 300 includes a circuit breaker 310, a gas insulated busbar unit 320, a first switch 330, a second switch 340, a third switch 350, a cable head 360, a voltage transformer 370, a first current transformer 380, and a second current transformer 390.

The circuit breaker 310 flows current therethrough in normal state, but instantaneously activates to protect lines and other units in abnormal state (e.g., overflow in current). The circuit breaker 310 may be installed on ground and may include a circuit breaker driving unit 312. The circuit breaker driving unit 312 may drive the circuit breaker 310.

The gas insulated busbar unit 320 has a busbar in a housing filled with insulation gas and provides a current path by electrically connecting with units in the GIS 300.

The first switch 330 connects a first main busbar 600a and switches the GIS 300. In one embodiment, the first switch 330 may include a first disconnecting switch 332 and a first ground switch 334 such that the GIS 300 has normal state, disconnecting state and ground state. For example, the first switch 330 may be implemented as a 2 phase switch or 3 phase switch. In another embodiment, the first switch 330 may be implemented as switch having a disconnecting switch, a repair ground switch and a line ground switch.

The second switch 340 connects a second main busbar 600b and switches the GIS 300. In one embodiment, the second switch 340 may include a second disconnecting switch 342 and a second ground switch 344 such that the GIS 300 has normal state, disconnecting state and ground state. For example, the first switch 340 may be implemented as a 2 phase switch or 3 phase switch. In another embodiment, the second switch 340 may be implemented as a switch having a disconnecting switch, a repair ground switch, and a line ground switch.

The third switch 350 switches the GIS 300. One embodiment may include a third disconnecting switch 352 and a third ground switch 354 such that the GIS 300 has normal state, disconnecting state, and ground state.

In one embodiment, the third switch 350 may include a line ground switch 356, and the third ground switch 354 may be used as a repair ground switch. Herein, the line ground switch 356 is installed in an inlet of the line to connect or disconnect the line.

The cable head 360 is equipment for connecting high voltage power cable with underground power cable and is connected with power cable laid underground.

The voltage transformer 370 is connected with the cable head 360 and transforms a relatively high voltage into a relatively low voltage.

The first current transformer 380 transforms an amount of current flowing between the circuit breaker 310 and the third switch 350. The second current transformer 390 transforms an amount of current flowing between the circuit breaker 310 and the gas insulated busbar unit 320.

Herein, the gas insulated busbar unit 320 is connected with one side of the second current transformer 390, and the first switch 330 and the second switch 340 are connected with one side (e.g., bottom) of the gas insulated busbar unit 320. For example, a rear of the gas insulated busbar unit 320 is connected with a front of the second current transformer 390. The first switch 330 and the second switch 340 are electrically connected side by side with a bottom of the gas insulated busbar unit 320 and are arranged spaced apart from ground.

In one embodiment, the gas insulated busbar unit 320 may have multiple paths (e.g, F-type) to connect the second current transformer 390, the first switch 330, and the second switch 340.

One side of the third switch 350 is connected with the first current transformer 380, and another side of the third switch 350 is connected with the cable head 360. Also, the voltage transformer 370 is connected with a top of the cable head 360.

The first current transformer 380 and the second current transformer 390 respectively connect with one side and another side of the circuit breaker 310. In one embodiment, the first current transformer 380 and the second current transformer 390 may be respectively connected with a rear and a front of the circuit breaker 310 and may be arranged in the same height. Herein, the height indicates a distance from the ground where the GIS 300 is installed.

Figure 4:
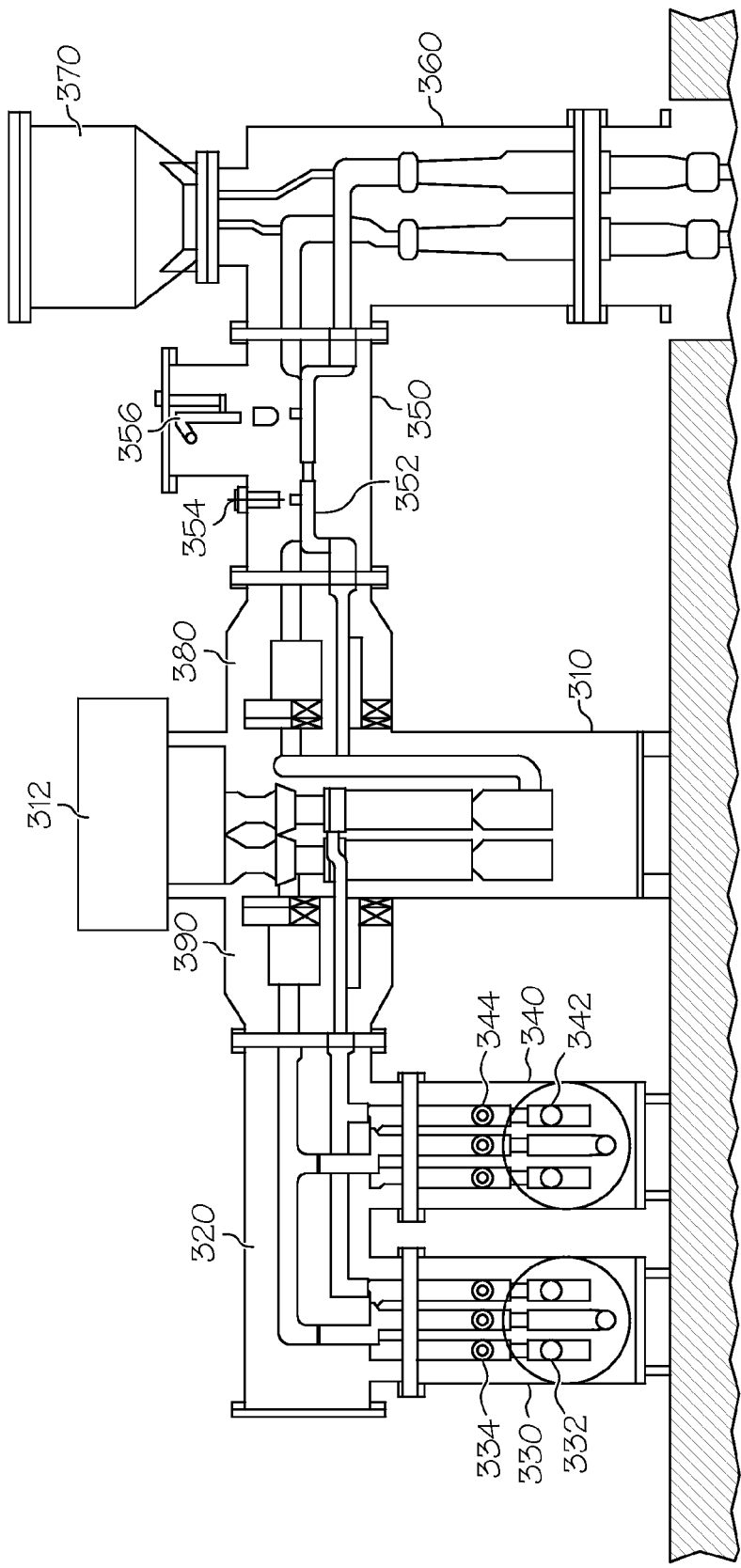
FIG. 4 is a diagram illustrating a GIS where a first current transformer and a circuit breaker are packaged according to an embodiment of the invention.

FIG. 4 is a diagram illustrating one example embodiment of GIS where a first current transformer and a circuit breaker are packaged.

In FIG. 4, the first current transformer 380 and the circuit breaker 310 may be included in package-type housing. That is, the first current transformer 380 and the circuit breaker 310 may share insulation gas in a single housing.

Figure 5:
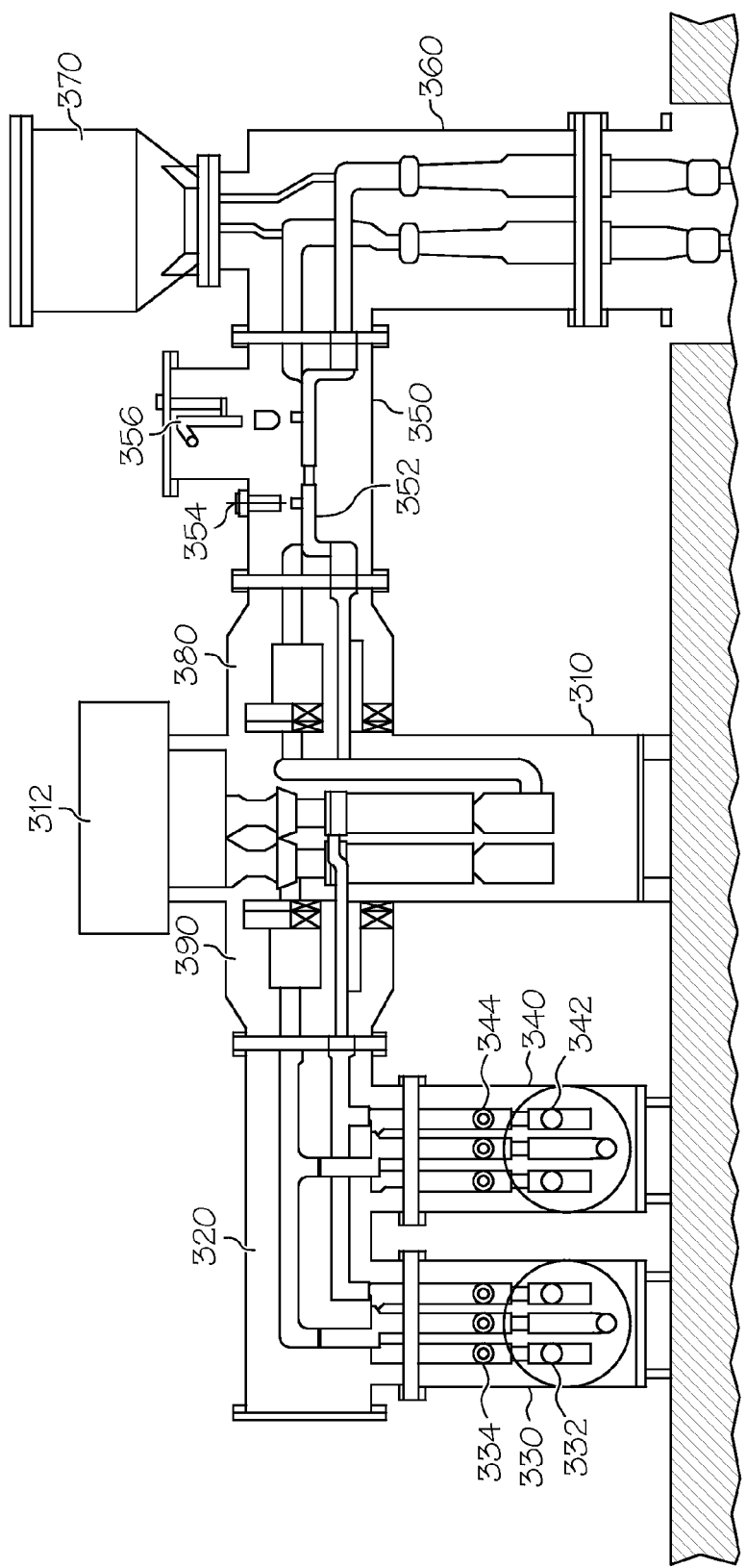
FIG. 5 is a diagram illustrating a GIS where first and second current transformers and a circuit breaker are packaged according to an embodiment of the invention.

FIG. 5 is a diagram illustrating one example embodiment of GIS where first and second current transformers and a circuit breaker are packaged.

In FIG. 5, the first and second current transformers 380 and 390 and the circuit breaker 310 may be included in package-type housing. That is, first and second current transformers 380 and 390 and the circuit breaker 310 may share insulation gas in a single housing.

Figure 6:
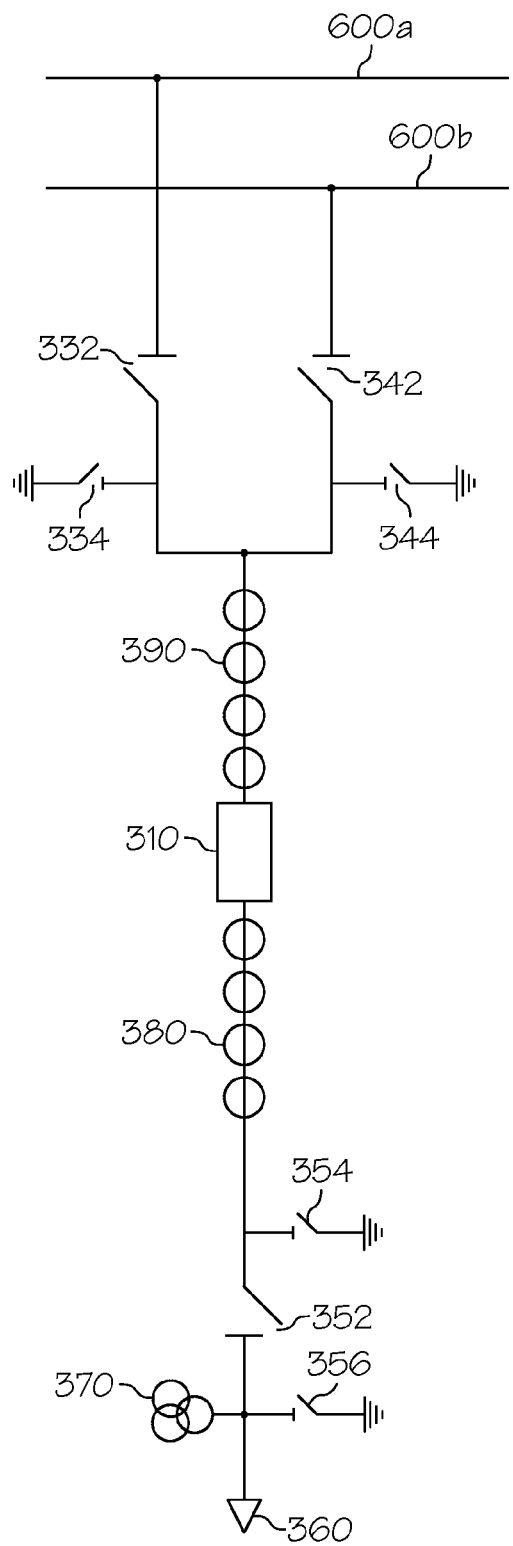
FIG. 6 is a circuit diagram illustrating a GIS of FIG. 3, FIG. 4 or FIG. 5.

FIG. 6 is a circuit diagram illustrating a GIS in FIG. 3, FIG. 4 or FIG. 5.

Figure 2:
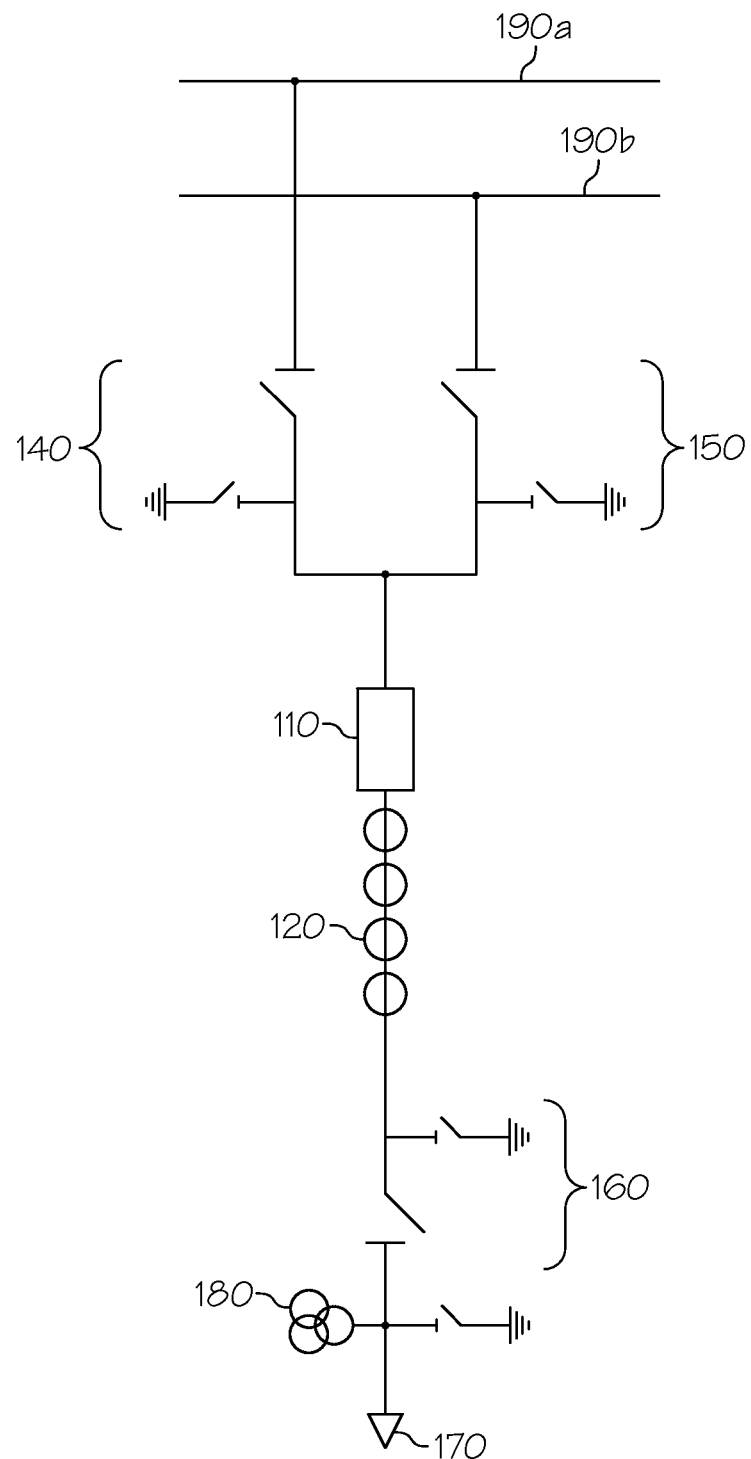
FIG. 2 is a circuit diagram of the prior art GIS shown in FIGS. 1(a)-(b).

Comparing the circuits in FIG. 2 and FIG. 6, the first and second current transformers 380 and 390 are connected with first and second sides (e.g, front and rear) of the circuit breaker 310 in FIG. 6.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A gas insulated switchgear comprising:
a circuit breaker, a first switch, a second switch, and a third switch, a voltage transformer, a cable head, a gas insulated busbar unit, and a first current transformer and a second current transformer,
wherein the gas insulated busbar unit is connected with the second current transformer, and the first and second switches are connected with a bottom of the gas insulated busbar unit,
wherein the third switch is connected with the first current transformer, the cable head is connected with the third switch and the voltage transformer is connected with a top of the cable head, and
wherein the first and second current transformers are respectively connected with a first side and a second side of the circuit breaker.
2. The gas insulated switchgear of claim 1, wherein the first current transformer and the circuit breaker are included in package-type housing.
3. The gas insulated switchgear of claim 1, wherein the first current transformer, a second transformer, and the circuit breaker are included in package-type housing.
4. The gas insulated switchgear of claim 1, wherein the first, second and third switches include a disconnecting switch and a ground switch to have normal state, disconnecting state, and ground state.
5. The gas insulated switchgear of claim 1, wherein the first, second and third switches include a disconnecting switch, a repair ground switch, and a line ground switch.

* * * * *